United States Patent [19]

Carlin et al.

[11] 4,154,301

[45] May 15, 1979

[54] SURFACTANT OIL RECOVERY PROCESS USABLE IN A FORMATION HAVING HIGH SALINITY CONNATE WATER

[75] Inventors: Joseph T. Carlin; John A. Wells; Timothy N. Tyler, all of Houston, Tex.

[73] Assignee: Texaco Inc., New York, N.Y.

[21] Appl. No.: 920,902

[22] Filed: Jun. 29, 1978

[51] Int. Cl.$^2$ .............................................. E21B 43/22
[52] U.S. Cl. .................................... 166/273; 166/274; 252/8.55 D
[58] Field of Search ............... 166/273, 274, 275, 252, 166/305 R; 252/8.55 D

[56] References Cited

U.S. PATENT DOCUMENTS

| | | | |
|---|---|---|---|
| 3,477,511 | 11/1969 | Jones et al. | 166/274 |
| 3,500,919 | 3/1970 | Holm | 166/274 X |
| 3,508,612 | 4/1970 | Reisberg et al. | 166/274 |
| 3,811,505 | 5/1974 | Flournoy et al. | 166/273 X |
| 3,811,507 | 5/1974 | Flournoy et al. | 166/273 X |
| 3,865,187 | 2/1975 | Carlin et al. | 166/273 |
| 3,920,073 | 11/1975 | Holm | 166/275 X |
| 4,066,124 | 1/1978 | Carlin et al. | 166/275 X |
| 4,077,471 | 3/1978 | Shupe et al. | 166/275 |

Primary Examiner—Stephen J. Novosad
Attorney, Agent, or Firm—Thomas H. Whaley; Carl G. Ries; Charles L. Bauer

[57] ABSTRACT

In the recovery of oil from an oil-bearing formation having a high salinity connate water wherein an aqueous surfactant slug containing a commercially available petroleum sulfonate is injected followed by the injection of an aqueous drive agent, improved recovery is obtained, if a cosurfactant and a mono-unsaturated secondary alcohol are added to the surfactant slug.

12 Claims, 2 Drawing Figures

HISTORY OF SURFACTANT WATER FLOOD FOR TESTS NO'S 5 & 8, SHOWING EFFECT OF CHOLESTEROL IN SURFACTANT FLOOD.

A = waterflood using synthetic fuld water.
B = surfactant slug.
C = polymer slug.
D = waterflood.

HISTORY OF SURFACTANT WATER FLOOD FOR TESTS NO's 5 & 8, SHOWING EFFECT OF CHOLESTEROL IN SURFACTANT FLOOD.

A = waterflood using synthetic fuld water.
B = surfactant slug.
C = polymer slug.
D = waterflood.

— EFFECT OF CHOLESTEROL ON INTERFACIAL TENSION IN AQUEOUS PETROLEUM SULFONATE SOLUTION CONTAINING A COSURFACTANT.

*COSURFACTANT IS Sipex EST-75 (Sulfated, ethoxylated) Tridecyl alcohol

SURFACTANT OIL RECOVERY PROCESS USABLE IN A FORMATION HAVING HIGH SALINITY CONNATE WATER

FIELD OF THE INVENTION

This invention relates to a surfactant waterflood process for the recovery of oil from a subterranean oil-bearing formation having a high salinity connate water utilizing an aqueous slug containing a commercially available petroleum sulfonate, a cosurfactant and a mono-unsaturated secondary alcohol.

DESCRIPTION OF THE PRIOR ART

Primary production of oil from subterranean oil-bearing formations is normally obtained by exploiting the natural energy of the formation in the form of water drive, gas cap drive, solution gas drive and combinations thereof. Because these "primary recovery" techniques leave substantial amounts of oil in the formation, secondary recovery methods are utilized whereby additional oil is recovered after primary energy sources have been depleted. One of the more widely-practiced secondary methods is water-flooding. In this method, flood water is injected into the reservoir via one or more injection wells traversing the oil-bearing formation. The water displaces the oil in the formation and moves it through the formation toward one or more production wells from which the oil is produced. However, because water and oil are immiscible, and because of the existence of high interfacial tension between the water and oil, waterflooding does not displace oil with high efficiency. Consequently, waterflooding may recover only an additional 30 to 50% of the oil remaining in place after primary production.

In order to recover additional oil, tertiary recovery methods have been developed, that are improvements on the conventional waterflooding. For example, if the crude oil contains natural emulsifiers, additional oil may be recovered by the injection of an alkaline water whereby emulsification is promoted, with consequent lowering of the interfacial tension between the water and the oil. Other methods include the injection into the formation of a slug of oil containing an emulsifier and thereafter injecting alkaline water to promote emulsification. However, in many instances emulsification is retarded because of the presence of alkali salts such as sodium chloride in the connate water. As a result, emulsion type processes are generally limited to formations having fresh connate water or connate water with low brine concentrations.

One approach to the problem of high brine or high salinity connate water is disclosed in U.S. Pat. No. 3,865,187, whereby the emulsification of crude oil in the presence of briny water is enhanced, and thus recovery is increased, by injecting a hydrocarbon slug containing a mono-unsaturated secondary alcohol such as cholesterol followed by a brine solution containing a sulfate salt of a fatty alcohol such as sodium dodecyl sulfate. The mono-unsaturated secondary alcohol is effective as an oil recovery agent in that it spontaneously emulsifies upon contact with the sulfate salt of the fatty alcohol.

Prior art also teaches the use of surfactants or surface-active agents to increase oil recovery. The surface-active agent is generally injected in an aqueous or non-aqueous slug ahead of the flooding water. These agents effect enhanced recovery of oil by increasing the wettability of the reservoir matrix by water and by decreasing the interfacial tension between the oil and the water phases.

While the surface-active agents may be anionic, cationic, or nonionic and mixtures thereof, the most commonly used ones are the anionic petroleum sulfonates. These sulfonates are generally satisfactory for surfactant waterflooding only if the concentration of the polyvalent ions such as magnesium or calcium in the connate water is less than about 500 parts per million (ppm). If the formation connate water contained more than this amount, the petroleum sulfonates precipitate rapidly as the calcium or magnesium salts. When precipitation occurs, not only is the desired surfactant benefit lost, but also plugging of the formation may occur.

Since many subterranean oil-bearing formations are known to exist that contain polyvalent ions in concentrations higher than 500 ppm, a number of suggestions to avoid the problem of precipitation has been put forth. In U.S. Pat. No. 3,508,612, an oil recovery method is taught that utilizes a mixture of an anionic and a sulfated ethoxylated alcohol, that results in improved recovery in the presence of high calcium concentrations.

Other advances in the art include the employment of certain combinations of anionic and nonionic surfactants in hard water formations, such as in U.S. Pat. No. 3,811,505 and U.S. Pat. No. 3,811,507 that disclose the use of mixtures of an anionic surfactant and a nonionic surfactant. The anionic surfactant is, for example, a water-soluble alkyl or alkylaryl sulfonate, and the nonionic surfactant is a polyethoxylated alkyl phenol.

It is believed that the nonionic surfactants such as polyethoxylated aliphatic alcohols, polyethoxylated alkyl phenols, have a somewhat higher tolerance for polyvalent ions than do the more common anionic surfactants, although they are not as effective on a per unit weight basis.

Other improvements in waterflooding that have been disclosed relate to the use of water-soluble polymers in the flood water, whereby the viscosity of the flood water is increased. The "thickened" water results in a more favorable mobility ratio and leads to improved oil recovery. The polymeric compounds may be incorporated in a slug sometimes referred to as a "mobility control" slug that is injected prior to the injection of the flood water. In one scheme of operation a mobility control slug is injected after the injection of a surfactant slug and before the injection of the flood water. Among the materials employed are the water-soluble hydrolyzed or partially hydrolyzed acrylamide polymers such as Dow Pusher 700 manufactured by the Dow Chemical Co. and the polysaccharides such as Xanflood manufactured by the Kelco Company.

With the advances in the art of surfactant flooding, the methods employed today generally involve the injection into the formation of a first slug of a surfactant contained in an aqueous or hydrocarbon carrier. The slug may also contain inorganic salts, i.e. sodium chloride, to improve the compatibility of the slug with the formation fluids. The first slug is then followed, optionally, by a mobility control slug containing a mobility control agent, which slug is then followed by the flood water. From the combined use of a solution of a surfactant to decrease the surface tension between the water and the oil in the formation and a solution of polymeric material to improve the mobility ratio and displacement efficiency, the benefits of both materials are realized in enhanced recovery.

Variations of the general scheme may include incorporating the surfactant and the polymeric material or thickener into one slug, and the preconditioning of the formation by the injection of "pretreatment" slugs containing generally inorganic soluble salts that function to make the reservoir and its fluids more compatible with the subsequently injected surfactant and mobility control slugs. The variations are dictated by the formation characteristics, the type and composition of the oil and the type and composition of the connate water.

The most commonly used surfactants are the anionic sulfonates and in particular the petroleum sulfonates that are mixtures of sulfonated hydrocarbons. The petroleum sulfonates are obtained from the sulfonation of petroleum feedstocks having a given temperature range and containing aromatic constituents. U.S. Pat. No. 3,302,713 teaches a surfactant waterflooding process that employs a surfactant prepared by sulfonating at least a portion of the sulfonatable constituents of a petroleum feedstock having a temperature range of from 700° F. to 1100° F. Other prior art, U.S. Pat. No. 3,468,377 describes the use of a mixture of petroleum sulfonates having a specified molecular weight, namely having a median molecular weight of from about 375 to about 430.

The sulfonatable constituents of the feedstocks are primarily aromatic hydrocarbons including both alkylated benzenes and the condensed alkylated aromatic hydrocarbons. The nonaromatic portion of the feedstock fraction, comprising principally mineral oil, is unsulfonatable and remains unreacted. In commercially available petroleum sulfonates this unreacted hydrocarbon portion is generally present in amount of from about 5% to about 20%. The cost of manufacturing these materials is largely determined by the activity (% petroleum sulfonate) of the mixture. To increase the activity, a purification step is necessary to remove the unreacted hydrocarbon portion thereby increasing the cost. Most commercially available petroleum sulfonates contain oil and water. The oil content can be as high as 50%. When a commercial petroleum sulfonate concentrate is used in field applications, dilution with water results in a concentration of about 0.1% to about 1.0% of the unsulfonated hydrocarbon. This diluted sulfonate is referred to as an aqueous surfactant system. In *Improved Oil Recovery by Surfactant Polymer Flooding*, D. O. Shah and R. S. Schechter (Editors), (Academic Press Inc.), at page 393 an aqueous surfactant flooding system is described as one having no oil in the material injected except for that unreacted and not separated from the surfactant during manufacture.

We have now determined that enhanced recovery is realized when a mono-unsaturated secondary alcohol, i.e., cholesterol, is used in the aqueous slug containing the commercially available petroleum sulfonate. Further, we have determined that the unreacted hydrocarbon portion of the commercially available petroleum sulfonate can be effectively utilized as the solvent carrier for the mono-unsaturated secondary alcohol.

SUMMARY OF THE INVENTION

This invention relates to the enhanced recovery of oil from a subterranean oil-bearing formation wherein an aqueous slug of a commercially available petroleum sulfonate is used with a cosurfactant and a mono-unsaturated secondary alcohol, whereby the unreacted hydrocarbon in the sulfonate is utilized as the carrier for the mono-unsaturated alcohol.

DESCRIPTION OF THE PREFERRED EMBODIMENT

Figure 1:
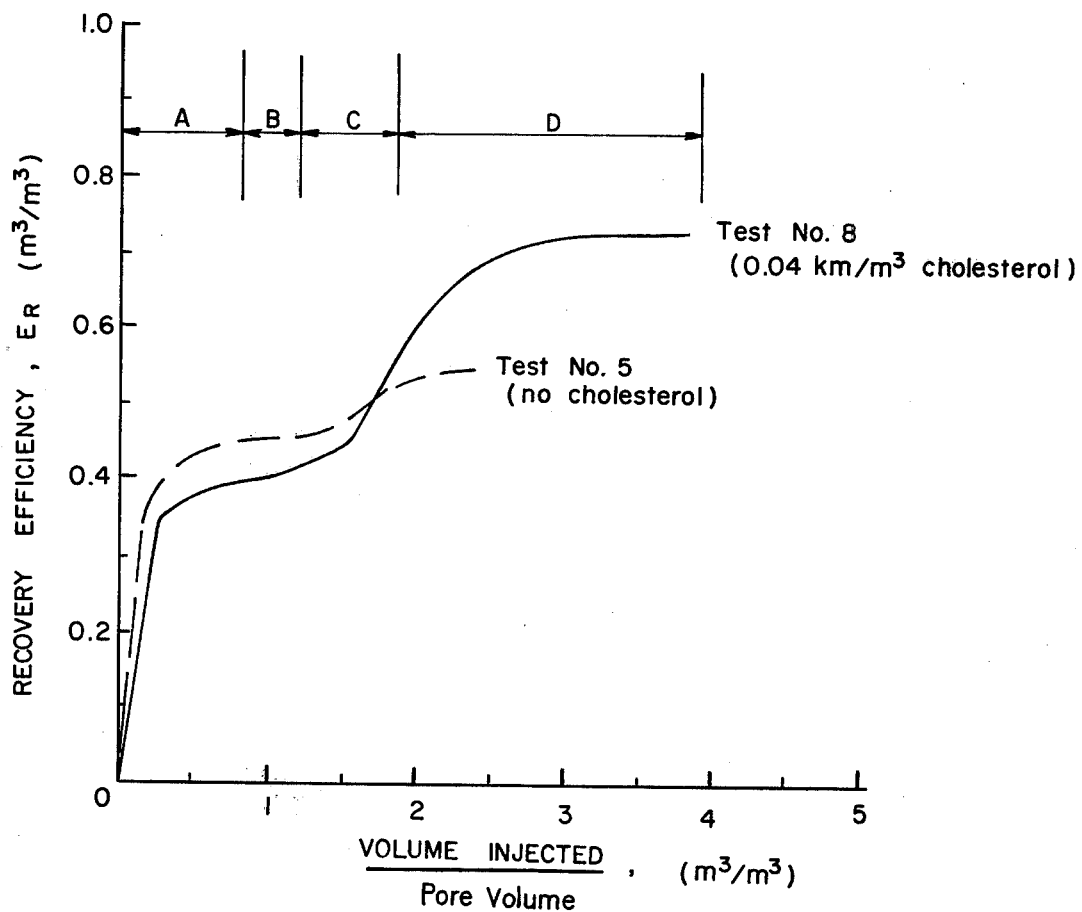
FIG. 1 demonstrates the effect of cholesterol in the aqueous petroleum sulfonate surfactant slug in increasing oil recovery.

This invention relates to a method for the recovery of oil frm a subterranean oil-bearing formation having a high salinity connate water wherein a slug of a mixture of a commercially available petroleum sulfonate, a cosurfactant and a mono-unsaturated secondary alcohol is injected into the formation prior to the undertaking of a waterflood. By the invention, advantage is taken of the fact that the unreacted hydrocarbon portion of a commercially available petroleum sulfonate is used as a solvent for the mono-unsaturated secondary alcohol to enhance recovery.

By the invention a mono-unsaturated secondary alcohol, that is soluble in oil, is added to the surfactant slug composition whereby the alcohol is partitioned into the unreacted oil phase that is present in a commercially available petroleum sulfonate material. The oil phase thus acts as a carrier for the alcohol, and is thereby effectively utilized in the method of recovery. Furthermore, the presence of the mono-unsaturated secondary alcohol results in substantial improvement in the oil recovery.

The invention can be illustrated by a series of laboratory core displacement tests in which the following procedure was used. A sandstone core was potted by sealing it in a steel barrel with epoxy resin and thereafter machining the ends. The core, suitably mounted, was evacuated and then filled with a saline synthetic field water having the following composition:

| | |
|---|---:|
| $CaCl_2$ | 8,075 ppm |
| $MgCl_2 \cdot 6H_2O$ | 8,207 ppm |
| $NaHCO_3$ | 168 ppm |
| NaCl | 81,797 ppm |
| Total Dissolved Solids | 98,247 ppm |

After the pore volume ($V_p$) of the core was determined, a crude oil having a 36° API was injected for several pore volumes. The core was then waterflooded to an irreducible oil saturation with the aforementioned synthetic field water. The test surfactant flood was then undertaken by the injection of a first slug having the desired composition after which a polymer slug was injected and then followed by a waterflood utilizing the synthetic field water. The rate of flow of the various slugs was controlled by a positive displacement mercury pump. A typical injection rate was 18–20 cc/hr (a Darcy velocity of about 4 ft/day).

Eight displacement tests were conducted, the results of which in terms of recovery efficiency are given in the following table. Recovery efficiency is defined as the ratio of the oil present in the core after test to that present before test, expressed in cubic meters per cubic meters ($m^3/m^3$).

TABLE I

| Test No. | Slug Composition | Concentration (wt. %) | Pore Volumes Injected | Recovery Efficiency $m^3/m^3$ |
|---|---|---|---|---|
| 1. | FA-400[a] | 2.0 | 0.39 | 0.29 |
|  | N 50 CS[b] | 1.8 |  |  |
| 2. | FA-400 | 1.0 |  |  |
|  | TRS-40[c] | 1.0 | 0.37 | 0.31 |
|  | N 50 CS | 0.5 |  |  |
| 3. | FA-400 | 1.0 |  |  |
|  | TRS-40 | 1.0 | 0.41 | 0.30 |
|  | N 50 CS | 1.1 |  |  |
| 4. | FA-400 | 0.6 |  |  |
|  | TRS-40 | 1.4 | 0.39 | 0.23 |
|  | N 50 CS | 0.55 |  |  |
| 5. | FA-400 | 1.0 |  |  |
|  | TRS-40 | 0.8 | 0.50 | 0.38 |
|  | Sipex EST-75[d] | 0.8 |  |  |
| 6. | FA-400 | 1.0 |  |  |
|  | TRS-40 | 0.8 |  |  |
|  | Sipex EST-75 | 0.8 | 0.50 | 0.40 |
|  | Dodecyl Alcohol | 0.1 |  |  |
| 7. | FA-400 | 1.0 |  |  |
|  | TRS-40 | 0.8 | 0.54 | 0.41 |
|  | Sipex EST-75 | 0.8 |  |  |
|  | Propanol | 0.2 |  |  |
| 8. | FA-400 | 1.0 |  |  |
|  | TRS-40 | 0.8 |  |  |
|  | Sipex EST-75 | 0.8 | 0.35 | 0.54 |
|  | Cholesterol | 0.004 |  |  |
| a. | FA-400 | Petroleum sulfonate having an eq. wt. about 400 (Manufactured by EXXON) | | |
| b. | N 50 CS | Ethoxylated sulfonated nonyl phenol with 5 moles ethylene oxide | | |
| c. | TRS-40 | Petroleum sulfonate having an eq. wt. about 332 (Manufactured by WITCO) | | |
| d. | Sipex EST-75 | Ethoxylated sulfated tridecyl alcohol (Manufactured by Alcolac Chemical) | | |

Test number 1 used an aqueous surfactant fluid containing a mixture of commercially available sulfonates. The test, which served as a standard of comparison, resulted in a recovery efficiency of 0.29 $m^3/m^3$ for 0.39 pore volumes injected. Tests numbers 2 through 4 utilized an anionic cosurfactant (an ethoxylated sulfonated nonyl phenol) with the petroleum sulfonate mixture. The results show that comparable recovery efficiencies were obtained (0.23–0.31 $m^3/m^3$). In test number 5 an anionic cosurfactant alcohol (an ethoxylated sulfated tridecyl alcohol) was added to the slug composition. The results show an increase in recovery efficiency over that of the earlier runs (0.38 $m^3/m^3$–0.41 $m^3/m^3$). In tests numbers 6 and 7 a cosurfactant mixture of a nonionic and an anionic alcohol were used. The results showed that recovery efficiency was not materially increased by the cosurfactant mixture (0.40–0.41 $m^3/m^3$). In test number 8 (which demonstrates the invention) a mono-unsaturated secondary alcohol was added together with the anionic cosurfactant (ethoxylated sulfated tridecyl alcohol). The results show that significant increase in recovery efficiency was attained (0.54 $m^3/m^3$).

The results of the core displacement tests for Runs 5 and 8 are also plotted in FIG. 1 in which the flood histories are shown. The abscissa is expressed as a non-dimensional unit that indicates the fraction of pore volume for the core being used. The tests demonstrated that the addition to the surfactant slug of 0.04 Kg/$m^3$ (0.004% by wt.) of cholesterol increased the recovery efficiency from 38% for the test without the cholesterol, to 54%.

Additional tests were made in which interfacial tension measurements were determined by the "Sessile Drop Method" for aqueous surfactant mixtures containing a petroleum sulfonate and a cosurfactant with and without the presence of cholesterol. This method entails filling a square quartz cuvette with a surfactant solution, then, a drop of oil is injected into the cell and the system is allowed to equilibrate. The oil drop rests on a horizontal plane surface. A photographic record is made of the sessile drop and the oil-surfactant interfacial tension is obtained from the geometry of its profile.

Figure 2:
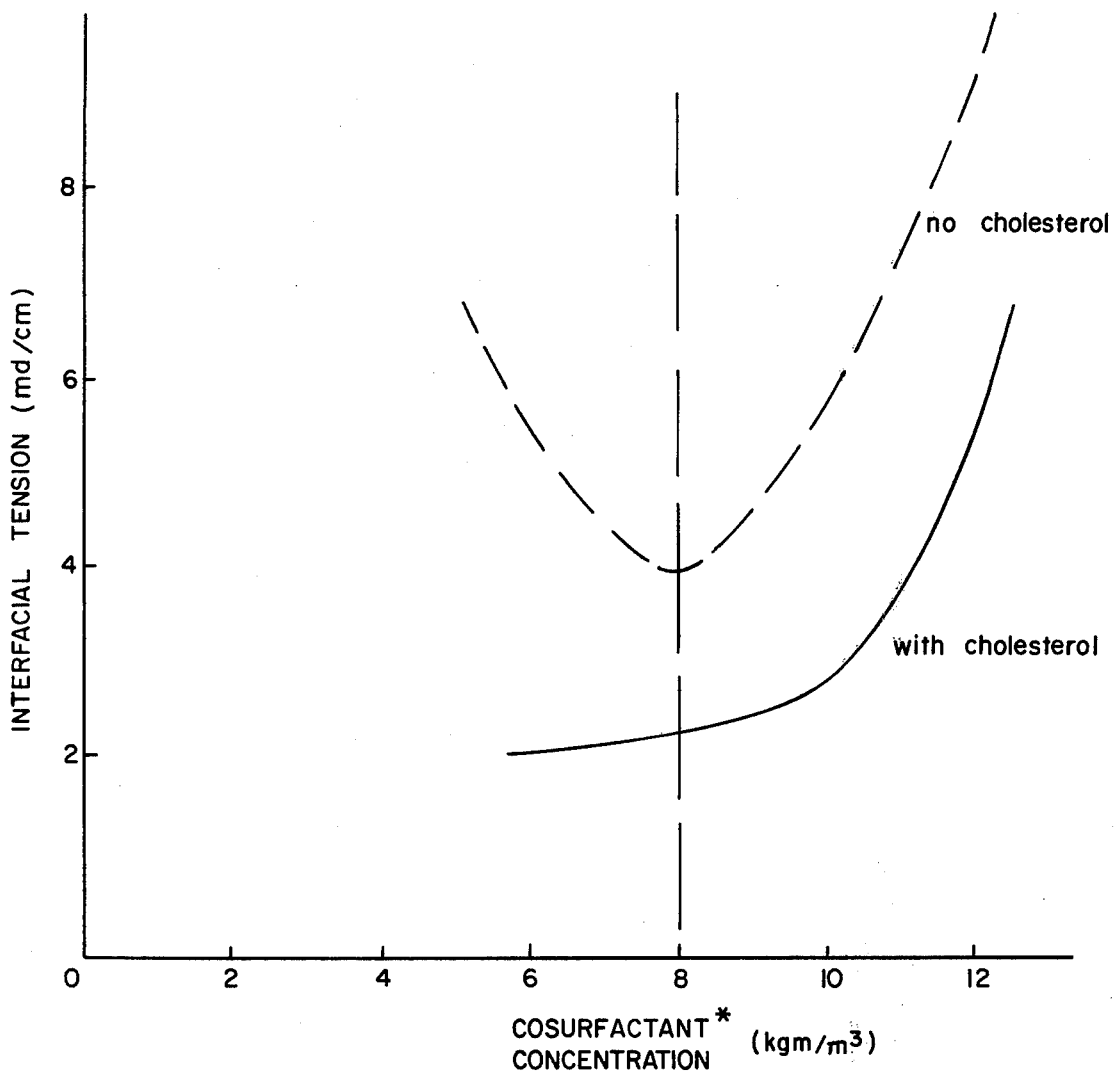
FIG. 2 illustrates the effect of cholesterol in a petroleum sulfonate surfactant solution, in reducing interfacial tension.

The results of these tests are shown in FIG. 2 in which the interfacial tension is plotted against the cosurfactant concentration. It can be seen that the presence of cholesterol in the aqueous petroleum sulfonate solution containing a cosurfactant results in a lower interfacial tension as compared with the test in which no cholesterol was present.

It is within the scope of the invention to utilize a mono-unsaturated secondary alcohol in an aqueous surfactant slug containing a petroleum sulfonate and a cosurfactant in any generalized scheme for accomplishing a waterflood wherein variations in the injection scheme and in the compositions as set forth in the prior art may be included. In one embodiment, in the recovery of oil from an oil-bearing reservoir having a high salinity connate water, the aqueous surfactant slug containing a commercially available petroleum sulfonate, a cosurfactant, and a mono-unsaturated secondary alcohol is injected into the formation. The aqueous phase of the slug may be brine, connate water, or fresh water and may also contain water-soluble inorganic salts, such as the salt of an alkali metal, as, for example, sodium chloride. The particular aqueous system selected for a given reservoir will depend upon the reservoir characteristics, and the compatibility of the slug with the formation fluids.

After the aqueous surfactant slug has been injected, an aqueous mobility control slug containing a polymeric material may be injected. The polymeric material may be a polyacrylamide or a polysaccharide and is generally present in amounts of from about 0.01% to about 0.5% by weight. This mobility control slug may then be followed by an aqueous drive agent.

In practicing the invention, it is recommended that the surfactant slug containing the commercially available petroleum sulfonate and the cosurfactant and the mono-unsaturated secondary alcohol be injected in the amount of from about 5% to about 50% of the reservoir pore volume.

The cosurfactant, which is present to enhance the compatibility of the surfactant slug with the formation fluids, is present in amounts of from about 0.3% to about 3.0% by weight. The cosurfactant may be selected from the group comprising ethoxylated phenols, ethoxylated alkyl phenols, ethoxylated alcohols, and sulfated and sulfonated derivatives of the aforesaid phenols and alcohols. Two examples of specific cosurfactants that have been used are an ethoxylated sulfonated nonyl phenol and an ethoxylated sulfated tridecyl alcohol.

The concentration of the mono-unsaturated secondary alcohol will depend upon, among other things, the nature of the specific alcohol being employed and the quantity of unreacted oil in the commercially available petroleum sulfonate. Generally, the concentration should be in the range of from about 0.001% to about 1.0% by weight, with the preferred range being from about 0.002% to about 0.006% by weight. A wide variety of mono-unsaturated secondary alcohols may be used provided they are soluble in hydrocarbon or oil. For example, the mono-unsaturated secondary alcohol may be a cyclic secondary alcohol such as cyclohexenol and its alkyl derivatives, such as methylcyclohexenol, propylcyclohexenol and pentacyclohexenol. In addition, the alcohol may be a dialkyl derivative such as dimethylcyclohexenol or trialkyl derivatives of cyclohexenol.

A second group of alcohols suitable for practicing this invention are the terpene alcohols which are alcohols derived from simple terpene hydrocarbons such as pulegol, isoborneol, menthol and piperitol.

Other mono-unsaturated secondary alcohols that are suitable are those having a condensed ring structure such as a polyalicyclic alcohol, i.e. cholesterol, and derivatives thereof.

The method of operation is applicable to a formation being produced in pattern arrangement, as for example, a pattern arrangement wherein a central well may serve as the production well and the offset wells may serve as the injection wells. One of the more common pattern arrangements is the 5-spot pattern in which four offset wells form the corners of a square and the fifth well is centrally located within the square. The method is also applicable to a line drive where one line of wells serve as the injection wells and the two adjacent lines of wells serve as production wells.

We claim:

1. In the method of recovering oil from an oil-bearing formation having a high salinity connate water said formation being traversed by at least two spaced wells and said method comprising the injection via one of said wells of an aqueous slug containing a commercially available petroleum sulfonate followed by the injection of an aqueous drive agent to displace said slug and said formation oil toward the second of said spaced wells and recovering said oil from said second spaced well, the improvement comprising:

the addition to said aqueous slug containing said commercially available petroleum sulfonate of a cosurfactant and a mono-unsaturated secondary alcohol.

2. The method of claim 1 wherein said aqueous slug is injected in amounts from about 5% to about 50% of the reservoir pore volume.

3. The method of claim 1 wherein said cosurfactant is contained in said aqueous slug in amounts of from about 0.3% to about 3.0% by weight.

4. The method of claim 1 wherein said cosurfactant is selected from the group consisting of ethoxylated phenols, ethoxylated alkyl phenols, ethoxylated alcohols, sulfated derivatives of said phenols and alcohols, sulfonated derivatives of said phenols and alcohols, and mixtures thereof.

5. The method of claim 1 wherein said mono-unsaturated secondary alcohol is present in said aqueous slug in a concentration of from about 0.001% to about 1.0% by weight.

6. The method of claim 5 wherein said mono-unsaturated secondary alcohol is present in said aqueous slug in a concentration of from about 0.002% to about 0.006% by weight.

7. The method of claim 1 wherein said mono-unsaturated secondary alcohol is selected from the group consisting of a cyclic secondary alcohol, alkyl derivatives of said cyclic secondary alcohols, terpene alcohols and derivatives thereof, polyalicyclic alcohols and derivatives thereof.

8. The method of claim 7 wherein said mono-unsaturated secondary alcohol is cholesterol, derivatives of cholesterol and mixtures thereof.

9. The method of claim 1 wherein said aqueous slug contains brine, connate water or fresh water.

10. The method of claim 1 wherein said aqueous slug contains a water-soluble inorganic salt of an alkali metal.

11. The method of claim 10 wherein said water-soluble salt is sodium chloride.

12. The method of claim 1 wherein the injection of said aqueous slug of petroleum sulfonate is followed by the injection of an aqueous slug containing a polymeric material prior to the injection of said aqueous drive agent.

* * * * *